(12) United States Patent
Uesaka et al.

(10) Patent No.: US 7,858,254 B2
(45) Date of Patent: Dec. 28, 2010

(54) ELECTROCHEMICAL ENERGY GENERATING APPARATUS AND METHOD OF DRIVING THE SAME

(75) Inventors: Shinichi Uesaka, Kanagawa (JP); Noritoshi Araki, Kanagawa (JP)

(73) Assignee: Sony Corporation, Tokyo (JP)

( * ) Notice: Subject to any disclaimer, the term of this patent is extended or adjusted under 35 U.S.C. 154(b) by 672 days.

(21) Appl. No.: 11/815,625

(22) PCT Filed: Jan. 13, 2006

(86) PCT No.: PCT/JP2006/300365

§ 371 (c)(1), (2), (4) Date: Aug. 6, 2007

(87) PCT Pub. No.: WO2006/085428

PCT Pub. Date: Aug. 17, 2006

(65) Prior Publication Data

US 2008/0286620 A1    Nov. 20, 2008

(30) Foreign Application Priority Data

Feb. 10, 2005   (JP)  .......................... P2005-034006

(51) Int. Cl.
*H01M 8/04* (2006.01)
*H01M 8/10* (2006.01)
(52) U.S. Cl. .................... 429/433; 429/447; 429/490
(58) Field of Classification Search .................. 429/13, 429/23, 24, 26, 30, 433, 447, 490
See application file for complete search history.

(56) References Cited

U.S. PATENT DOCUMENTS

| | | | |
|---|---|---|---|
| 6,194,094 B1 * | 2/2001 | Sugawara et al. ............. | 429/13 |
| 6,468,683 B1 * | 10/2002 | Menzer et al. ................ | 429/26 |
| 2002/0119352 A1 * | 8/2002 | Baldauf et al. ................ | 429/13 |
| 2003/0082421 A1 | 5/2003 | Yonetsu et al. | |
| 2004/0062964 A1 | 4/2004 | Matsuoka et al. | |

(Continued)

FOREIGN PATENT DOCUMENTS

DE    19802038    7/1999

(Continued)

OTHER PUBLICATIONS

International Search Report dated Apr. 18, 006 (3 pages).

(Continued)

*Primary Examiner*—Stephen J. Kalafut
(74) *Attorney, Agent, or Firm*—K&L Gates LLP

(57) ABSTRACT

An electrochemical energy generating apparatus with which the crossover of a fuel can be suppressed and a method of driving the apparatus are disclosed. The electrochemical energy generating apparatus (e.g., a fuel cell system) includes an electrochemical device (fuel cell) which has an electrolyte membrane 6 clamped between opposed electrodes and which generates electrochemical energy by a reaction of an alcohol with water at one (fuel electrode) of the electrodes and a fuel evaporating section by which a fuel including said alcohol and substantially not containing water is supplied in a gaseous state to the side of the one of the electrodes of the electrochemical device. The method of driving the electrochemical energy generating apparatus 1 includes supplying the fuel in the gaseous state to the one of the electrodes by the fuel evaporating section.

8 Claims, 3 Drawing Sheets

U.S. PATENT DOCUMENTS

2005/0058879 A1 * 3/2005 Guay .................. 429/38

FOREIGN PATENT DOCUMENTS

| DE | 19945715 | 4/2001 |
|----|----------|--------|
| EP | 1465276 | 10/2004 |
| JP | 02-234358 | 9/1990 |
| JP | 03-208260 | 9/1991 |
| JP | 11-144740 | 5/1999 |
| JP | 2001-6698 | 1/2001 |
| JP | 2001-93551 | 4/2001 |
| JP | 2001-283888 | 10/2001 |
| JP | 2003-86201 | 3/2003 |
| JP | 2004-146370 | 5/2004 |
| WO | 9750140 | 12/1997 |
| WO | 2005034274 | 4/2005 |

OTHER PUBLICATIONS

European Office Action issued on Sep. 9, 2009, for corresponding European Patent Application 06 71 1650.

Japanese Office Action corresponding to JP2005-034006 issued on Jan. 26, 2010.

* cited by examiner

ELECTROCHEMICAL ENERGY GENERATING APPARATUS AND METHOD OF DRIVING THE SAME

CROSS REFERENCE TO RELATED APPLICATIONS

The present application claims priority to Japanese Patent Document No. P2005-034006 filed on Feb. 10, 2005, the disclosure of which is herein incorporated by reference.

BACKGROUND

The present invention relates to an electrochemical energy generating apparatus and a method of driving the apparatus.

Because of the high energy density of fuel, fuel cells are expected as next-generation batteries for not only electric vehicles but also mobile apparatuses such as notebook type personal computers and mobile phones, and research and development thereof are being vigorously conducted in many research institutes and companies.

Especially, the so-called polymer solid electrolyte type fuel cells, in which a polymer solid electrolyte is used to form an ion-permeable electrolyte membrane, are considered to be suitable for application to batteries for electric vehicles and mobile apparatuses, because of their comparatively low operating temperatures.

The polymer solid electrolyte type fuel cells generally have a configuration in which electrodes are provided on both sides of an ion-permeable electrolyte membrane.

In addition, as a fuel for use in fuel cells, there have been investigated various chemical substances, such as hydrogen and aqueous solutions of alcohols represented by methanol.

Among others, the fuel cell in which a fuel including an aqueous solution of an alcohol such as methanol is supplied directly to an electrode is deemed as most promising as a fuel cell for mobile apparatuses, from the viewpoints of smaller system size, flexibility of fuel cartridge and the like (refer to, for example, Patent Document 1). Such form of fuel cell will hereinafter be referred to as the direct alcohol fuel supply type fuel cell.

As one example of fuel cell, there may be mentioned a configuration in which a pair of electrodes (a fuel electrode and an air electrode) are formed respectively on both sides of an electrolyte membrane. In this configuration, a methanol-water mixed liquid is supplied as a fuel to the fuel electrode, whereas oxygen gas or air is supplied as air gas to the air electrode, so as to generate electric power through the following electrochemical reactions.

Fuel electrode: $CH_3OH + H_2O \rightarrow CO_2 + 6H^+ + 6e^-$

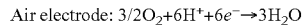

Air electrode: $3/2 O_2 + 6H^+ + 6e^- \rightarrow 3H_2O$

Cell reaction: $CH_3OH + 3/2 O_2 \rightarrow CO_2 + 2H_2O$

In short, methanol and water react with each other in a molar ratio of 1:1 on the fuel electrode side. Therefore, the mixing ratio of methanol and water in the aqueous methanol solution supplied to the fuel electrode side is desirably set to the same molar ratio as just-mentioned.

[Patent Document 1]

Japanese Patent Laid-open No. Hei 3-208260 (page 3, right bottom column, lines 1-6; FIG. 1)

However, the direct methanol fuel supply type fuel cell is known to have the problem of crossover. The crossover is a phenomenon in which the methanol supplied to the fuel electrode is not completely consumed in the reaction at the fuel electrode but, in part, permeates through the electrolyte membrane to reach the air electrode, to be consumed at the air electrode.

Due to the crossover, the amount of methanol to be inherently used for power generation is reduced, and a reverse electromotive force is generated, leading to a lowering in cell voltage. As a result, the fuel cell is lowered in output density and energy density.

It is also known that where a high-concentration aqueous methanol solution such as a methanol-water mixture with a molar ratio of 1:1 is used as the fuel, the crossover is conspicuous, whereby power generation characteristics would be considerably lower.

In order to solve this problem, development of an electrolyte membrane through which methanol permeates with difficulty and research and development for improving the fuel cell system have been being conducted.

For example, there is a method in which a low-concentration aqueous methanol solution prepared through sufficient dilution of methanol with water is supplied to the fuel electrode. Although the crossover is alleviated by this method, the amount of methanol in the fuel cartridge is greatly reduced, spoiling the high energy density, which is the characteristic inherent in the fuel cell.

Meanwhile, there has been disclosed a method in which an accessory is disposed in the exterior of a fuel cell, the water produced attendant on power generation at the air electrode is recovered by the accessory, high-concentration methanol is diluted with the recovered water, and the resulting aqueous methanol solution is supplied to the fuel electrode side (refer to, for example, Japanese Patent Laid-open No. 2004-146370). Since the water recovered at the air electrode is used in this method, it is possible to reserve high-concentration methanol in the fuel cartridge and, therefore, to make the fuel cartridge smaller in size. However, the need to dispose the accessory in the exterior of the fuel cell makes it difficult to render the fuel cell system smaller in size.

SUMMARY

The present invention has been made in order to solve the above-mentioned problems. Accordingly, in this present invention, it is desirable to provide an electrochemical energy generating apparatus, and a method of driving the apparatus, by which crossover of fuel can be reduced and a high energy density can be realized.

More specifically, the present invention pertains to an electrochemical energy generating apparatus including: an electrochemical device which has an electrolyte membrane clamped between opposed electrodes and which generates electrochemical energy through a reaction of an alcohol with water at one of the electrodes; and a fuel supplying unit by which a fuel including the alcohol and substantially not containing water is supplied in a gaseous state to the side of the one of the electrodes of the electrochemical device.

In addition, the present invention pertains also to a method of driving an electrochemical energy generating apparatus including an electrochemical device which has an electrolyte membrane between opposed electrodes and which generates electrochemical energy by a reaction of an alcohol with water at one of the electrodes, and a fuel supplying unit by which a fuel including the alcohol and substantially not containing water is supplied to the side of the one of the electrodes, the method including supplying the fuel in a gaseous state to the one of the electrodes by the fuel supplying unit.

Here, the expression "a fuel including the alcohol and substantially not containing water" includes the meaning of alcohol solutions commercialized for industrial use, specifically the alcohol solutions with a water content of less than 1 vol. %.

According to the present invention, the fuel including an alcohol and substantially not containing water is supplied in a gaseous state to the side of the one of the electrodes of the electrochemical device by the fuel supplying unit. Therefore, it is possible to enhance the diffusibility and reactivity of the fuel, to reduce the crossover of fuel, and to obtain a higher energy density, as compared with the case of supplying the alcohol in a liquid state or the case of supplying an aqueous solution of the alcohol as a fuel. In short, the characteristics of the electrochemical energy generating apparatus can be enhanced.

Additional features and advantages of the present invention are described in, and will be apparent from, the following Detailed Description and the Figures.

DETAILED DESCRIPTION

Figure 1:
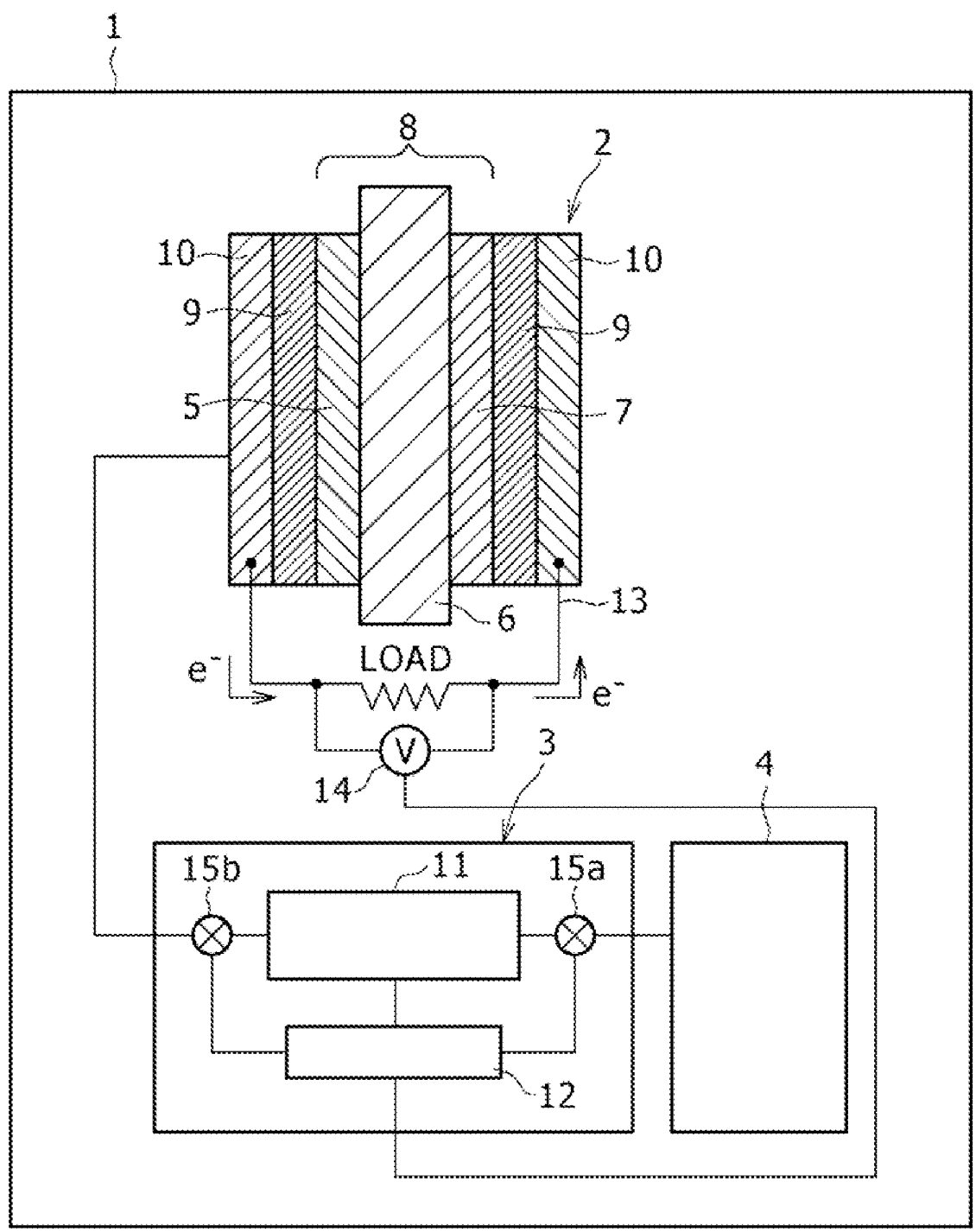
FIG. 1 is a schematic diagram of an electrochemical energy generating apparatus based on the present invention, configured as a fuel cell system, according to an embodiment of the invention.

In the present invention, the electrochemical device is desirably configured as a fuel cell. The fuel cell preferably includes a fuel electrode, an air electrode, and an ion-conductive electrolyte membrane clamped between the electrodes.

In addition, the fuel supplying unit preferably includes a fuel evaporating section and a fuel supply amount controlling section. Specifically, it is preferable that the fuel is evaporated (volatilized) in the fuel evaporating section, and control of the amount of the fuel supplied to the fuel evaporating section or control of the amount of the evaporated (volatilized, or gaseous) fuel supplied to the electrochemical device is performed by the fuel supply amount controlling section.

Besides, it is preferable that the amount of the gaseous fuel necessary for the reaction (cell reaction) is dividedly supplied to the one of the electrodes by the fuel supply amount controlling section. This makes it possible to minimize the crossover and to enhance the characteristics of the electrochemical energy generating apparatus based on the present invention, such as fuel cell system.

In the case where the electrochemical device is configured as the fuel cell and the fuel including an alcohol and substantially not containing water (for example, a fuel with an alcohol concentration of 99.8%) is supplied in a gaseous state to the one (the fuel electrode) of the electrodes (the fuel and air electrodes) by the fuel supplying unit as above-mentioned, there might arise a deficiency in the amount of water as compared with that necessary for complete consumption (reaction) of the alcohol at the fuel electrode. However, as a result of the present inventor's extensive and intensive investigations, it has newly been found out that even if water is not supplied to the fuel electrode, the water generated upon an electrochemical reaction at the air electrode permeates through the electrolyte membrane because of a concentration gradient to reach the fuel electrode side, where it reacts with the alcohol supplied on the fuel electrode side, so that the desired electromotive force can be taken out.

To be more specific, according to the present invention, the fuel including an alcohol and substantially not containing water is supplied in a gaseous state to the one (the fuel electrode) of the electrodes. Therefore, it is possible to enhance the diffusibility and reactivity of the fuel, to reduce the crossover of the fuel, and to obtain a higher energy density, as compared with the case of supplying the alcohol in a liquid state or the case of supplying an aqueous solution of the alcohol as a fuel. In short, the characteristics of the electrochemical energy generating apparatus can be enhanced according to the present invention.

In addition, the water generated on the air electrode side can be utilized for the reaction on the fuel electrode side, without using an accessory disposed in the exterior of the fuel cell as usual in the related art. As a result, it is possible to reduce the size of the electrochemical energy generating apparatus based on the present invention, such as a fuel cell system.

Furthermore, an efficient electrochemical reaction proceeds even though the fuel electrode is not supplied with water. This makes it possible for the alcohol to be reserved in a high-concentration state in a fuel cartridge. As a result, a greater amount of energy can be stably taken out of the electrochemical energy generating apparatus based on the present invention, such as fuel cell system.

Now, the configuration of the electrochemical energy generating apparatus based on the present invention will be described below, referring to the drawings.

FIG. 1 is a schematic diagram of an example of the electrochemical energy generating apparatus based on the present invention. As shown in FIG. 1, the electrochemical energy generating apparatus based on the present invention is configured as a fuel cell system 1. Specifically, the fuel cell system 1 includes a fuel cell 2 as the electrochemical device for generating electrochemical energy, a fuel supplying unit 3 for supplying the fuel cell 2 with the fuel including an alcohol and substantially not containing water, and a fuel cartridge 4 for reserving the fuel including an alcohol and substantially not containing water.

The fuel cell 2 includes: an MEA (membrane electrode assembly) 8 having a fuel electrode 5, an electrolyte membrane 6 and an air electrode 7 stacked in this order; diffusion layers 9; and current collectors 10.

The electrolyte membrane 6 is comprised of an ion-conductive electrolyte membrane, and is not particularly limited. Preferable examples of the electrolyte membrane include Nafion (registered tradename of a product by du Pont). In addition, the electrolyte membrane 6 has a thickness of preferably about 20 to 200 μm. If the thickness is less than 20 μm, the amount of crossover of the fuel may be increased; on the other hand, if the thickness exceeds 200 μm, the ion conductivity of the electrolyte membrane 6 tends to be lowered, possibly leading to a lowered function.

Preferably, the diffusion layers 9 are formed from a material being electroconductive and liquid- or gas-permeable, such as carbon paper and carbon cloth, and are sheet-like in shape.

The current collectors 10 are preferably formed from a material excellent in electroconductivity. In the case where the MEA 8 is supplied with the fuel or air by a pump, the current collectors 10 are preferably formed therein with passages for conducting the fuel or air, or formed in a meshed shape.

In the present invention, one or a plurality of fuel cells 2 may be disposed in the fuel cell system 1.

The fuel cartridge 4 may be formed from any material, provided that the material is corrosion-resistant when in contact with the alcohol, and the fuel cartridge 4 should be provided with a measure against liquid leakage.

The fuel supplying unit 3 includes a fuel evaporating section 11, and a fuel supply amount controlling section 12.

The fuel evaporating section 11 evaporates the alcohol, such as methanol, supplied from the fuel cartridge 4. The method of evaporation may be any method. For example, spontaneous (natural) volatilization is preferably adopted, because the apparatus operates at a high temperature; however, a structure including a heater for evaporating the alcohol by heating may also be adopted, especially for the purpose of coping with the use of the apparatus in a cold place.

The fuel supply amount controlling section 12 is connected to a voltmeter 14 provided in an external circuit 13 for the fuel cell 2 and to the fuel evaporating section 11, and has either a mechanism for controlling the amount of the alcohol supplied to the fuel evaporating section 11 or a mechanism for controlling the evaporated fuel supplied to the fuel cell 2.

For example, voltage is serially measured by the voltmeter 14 during the driving of the fuel cell 2, and the measured value is transmitted to the fuel supply amount controlling section 12. When the voltage value sent from the voltmeter 14 is below a certain value, a valve 15a is opened to additionally supply the fuel from the fuel cartridge 4 to the fuel evaporating section 11, or a valve 15b is opened to additionally supply the evaporated fuel from the fuel evaporating section 11 to the fuel electrode 5 side. Besides, when the amount of the evaporated fuel in the fuel evaporating section 11 is reduced, it is possible to additionally supply the fuel from the fuel cartridge 4 to the fuel evaporating section 11 by opening the valve 15.

In addition, it is preferable that the amount of the evaporated fuel necessary for the cell reaction is dividedly supplied to the fuel electrode 5, which is the one of the electrodes, by the fuel supply amount controlling section 12. This makes it possible to minimize the crossover of fuel, and to further enhance the characteristics of the fuel cell system 1 as the electrochemical energy generating apparatus based on the present invention.

Figure 2:
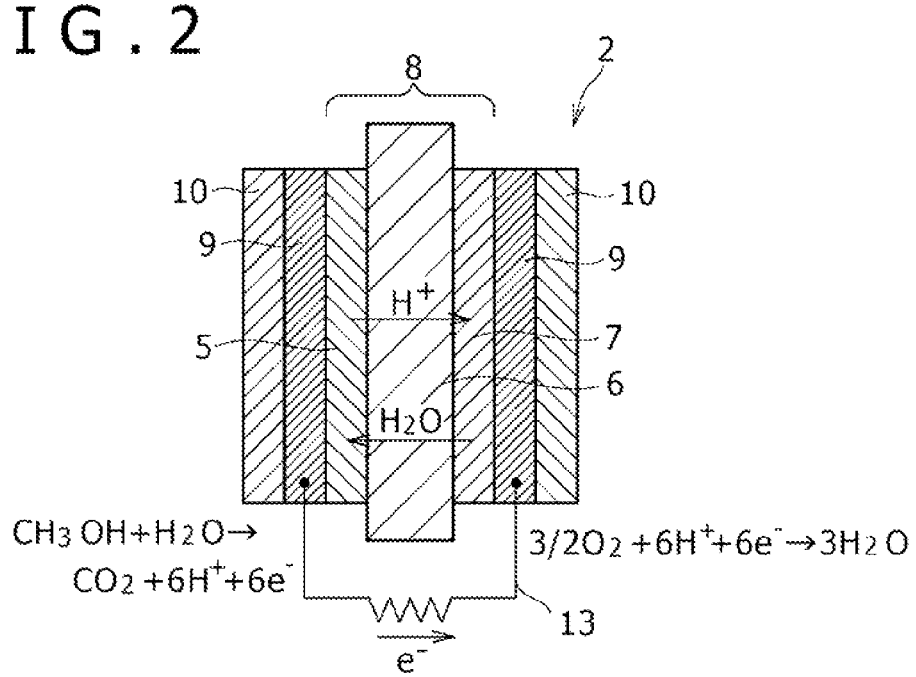
FIG. 2 is a schematic diagram showing a fuel cell in the fuel cell system according to the embodiment of the invention, at the time of driving.

In the fuel cell 2, the fuel electrode 5 is supplied with the fuel, for example, methanol (not containing water) in a gaseous state, while the air electrode 7 is supplied with air, for example. As a result, as shown in FIG. 2, the following reactions take place at the fuel electrode 5 and the air electrode 7, respectively, the protons (H+) generated at the fuel electrode 5 permeate through the electrolyte membrane 6, and electrons flow through the external circuit 13, whereby a function as a battery is realized.

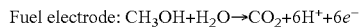

Fuel electrode: $CH_3OH + H_2O \rightarrow CO_2 + 6H^+ + 6e^-$

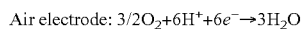

Air electrode: $3/2 O_2 + 6H^+ + 6e^- \rightarrow 3H_2O$

In the case where the electrochemical energy generating apparatus based on the present invention is configured as the fuel cell system 1 and the fuel including an alcohol and substantially not containing water is supplied in a gaseous state to the fuel electrode 5 by the fuel supplying unit 3, there might arise a deficiency in the amount of water as compared with that necessary for complete consumption (reaction) of the alcohol at the fuel electrode 5. However, as a result of the present inventor's extensive and intensive investigations, it has newly been found out that, as shown in FIG. 2, even if water is not supplied to the fuel electrode 5, the water generated upon the electrochemical reaction at the air electrode 7 permeates through the electrolyte membrane 6 because of a concentration gradient to reach the fuel electrode 5 side, where it reacts with the evaporated alcohol supplied to the fuel electrode 5, so that the desired electromotive force can be taken out.

To be more specific, according to the present invention, the fuel including an alcohol and substantially not containing water is supplied in a gaseous state to the fuel electrode 5. Therefore, it is possible to enhance the diffusibility and reactivity of the fuel, to reduce the crossover of the fuel, and to obtain a higher energy density, as compared with the case of supplying the alcohol in a liquid state or the case of supplying an aqueous solution of the alcohol as a fuel. In short, the characteristics of the electrochemical energy generating apparatus, such as the fuel cell system 1, can be enhanced according to the present invention.

In addition, the water generated at the air electrode 7 can be utilized for the reaction on the fuel electrode 5 side, without using an accessory disposed in the exterior of the fuel cell as usual in the related art. As a result, it is possible to reduce the size of the electrochemical energy generating apparatus based on the present invention, such as the fuel cell system 1.

Furthermore, an efficient electrochemical reaction proceeds even though the fuel electrode 5 is not supplied with water. This makes it possible for the alcohol to be reserved in a high-concentration state in the fuel cartridge 4. As a result, a greater amount of energy can be stably taken out of the electrochemical energy generating apparatus based on the present invention, such as the fuel cell system 1.

EXAMPLES

Now, the present invention will be described specifically below, based on examples.

Example 1

As the electrochemical device, a fuel cell 2 as shown in FIG. 1 was fabricated.

A fuel electrode 5 was prepared by mixing a catalyst, containing Pt and Ru in a predetermined ratio, with a dispersion of Nafion (registered trademark) in a predetermined ratio. In addition, an air electrode 7 was prepared by a catalyst, having Pt carried on carbon powder, with a dispersion of Nafion in a predetermined ratio.

Next, the fuel electrode 5 and the air electrode 7 prepared as above were hot pressed together with an about 90 μm-thick polymer solid electrolyte membrane (Nafion 1135 (registered trademark), a product by du Pont) under the conditions of 150° C. and 0.2 kN for 10 min, to prepare an MEA 8.

The MEA 8 was sandwiched by a 280 μm-thick carbon paper (product code: HGP-H-090, a product by Toray Industries, Inc.) and a titanium mesh, to fabricate the fuel cell 2. Here, the carbon paper corresponds to the diffusion layer 9, and the titanium mesh corresponds to the current collector 10.

A filter paper as the fuel evaporating section 11 was disposed adjacent to the fuel electrode 5 side, and the filter paper was impregnated with substantially water-free methanol (concentration 99.8 vol. %, here and hereinafter) as the fuel so that the methanol impregnating the filter paper would volatilizes spontaneously and the resulting gaseous methanol would be supplied to the fuel electrode 5.

In addition, a configuration was adopted in which the amount of the methanol impregnating the filter paper can be controlled by utilizing a syringe. The structure for thus controlling the amount of the methanol impregnating the filter paper by utilizing the syringe corresponds to the fuel supply amount controlling section. Specifically, during the driving of the fuel cell 2, voltage was serially measured by a voltmeter 14, and the measured value was transmitted to the fuel supply amount controlling section 12. When the voltage value sent from the voltmeter 14 was below a certain value, a predetermined amount (e.g., 3 μl) of methanol was fed to the filter paper by utilizing the syringe. It is to be noted that, while the amount of the methanol supplied to the filter paper is controlled by the fuel supply amount controlling section 12 in this experimental example, the amount of the evaporated methanol supplied from the fuel evaporating section 11 to the fuel cell 2 may be controlled.

Figure 3:
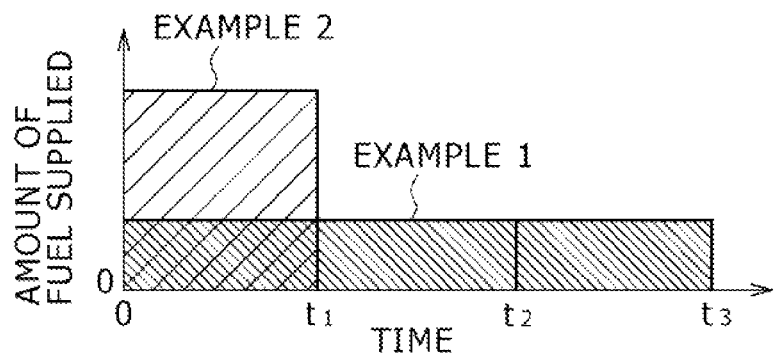
FIG. 3 is a graph showing the relationship between time and the amount of fuel supplied, according to the embodiment of the invention.

More specifically, in this experimental example, as shown in FIG. 3, the amount of the evaporated methanol necessary for the cell reaction was dividedly supplied to the fuel electrode 5 by the fuel supply amount controlling section 12. Here, the total amount of methanol supplied to the filter paper (fuel evaporating section 11) was 50 μl.

Example 2

A fuel cell system 1 was fabricated in the same manner as in Example 1, except that the same total amount (50 μl) of methanol as used in Example 1 was supplied to the filter paper at a time, without controlling the amount of methanol supplied to the filter paper (fuel evaporating section 11) by utilizing a syringe, as shown in FIG. 3.

Incidentally, in Examples 1 and 2, only the evaporated methanol was supplied to the fuel electrode 5, and the water necessary for consumption of methanol was not supplied to the fuel cell 5 at all.

Then, characteristics of the fuel cell systems fabricated in Examples 1 and 2 were evaluated.

The fuel cell was connected to an electrochemical measuring instrument (product name: MULTISTAT 1480, a product by Solartron), a control was made such that the current flowing in the fuel cell would be constant (100 mA), and the cell voltage of the fuel cell was serially read. The results are collectively shown in FIG. 4.

Comparative Example 1

A fuel cell system 1 was fabricated in the same manner as in Example 1, except that the system was so configured that methanol (500 μl) was supplied in a liquid state.

Comparative Example 2

A fuel cell system 1 was fabricated in the same manner as in Example 1, except that the system was so configured that a water-methanol mixture (with a molar ratio of 1:1, specifically, 446 μl of water plus 1000 μl of methanol) was supplied in a liquid state.

Characteristics of the fuel cell systems fabricated in Comparative Examples 1 and 2 were evaluated. Specifically, under such a control that the voltage of the fuel cell was kept at 0.3 V, the current was serially measured. The results are shown in FIG. 5.

Figure 4:
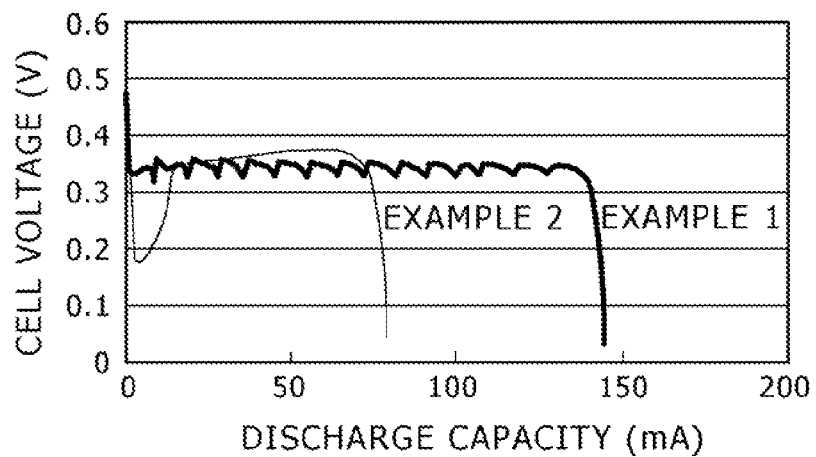
FIG. 4 is a graph showing the relationship between discharge capacity and cell voltage, according to the embodiment of the invention.

As is clearly seen from FIG. 4, in the case where the electrochemical energy generating apparatus based on the present invention was configured as the fuel cell system and methanol was supplied in the gaseous state from the filter paper (fuel evaporating section 11) to the fuel electrode 5, the fuel cell was capable of generating electric power for a long time, notwithstanding the absence of supply of water to the fuel electrode 5. This is because the water generated upon the electrochemical reaction at the air electrode 7 passed through the electrolyte membrane 6 because of a concentration gradient to reach the fuel electrode 5 side, where it reacted with the evaporated methanol supplied to the fuel electrode 5.

To be more specific, according to the present invention, the fuel including an alcohol and substantially not containing water was supplied in a gaseous state to the fuel electrode 5. Therefore, it was possible to enhance the diffusibility and reactivity of the fuel, to reduce the crossover of the fuel, and to obtain a higher energy density, as compared with the case of supplying the alcohol in a liquid state or the case of supplying an aqueous solution of the alcohol as a fuel. As a result, the characteristics of the electrochemical energy generating apparatus, such as the fuel cell system 1, could be enhanced according to the present invention.

Figure 5:
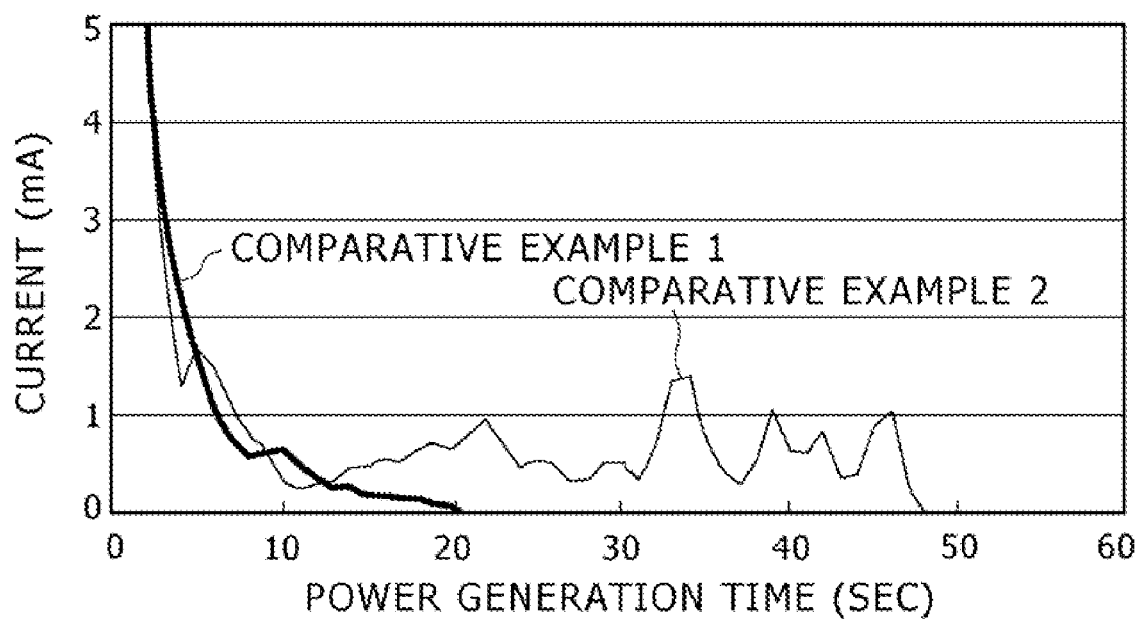
FIG. 5 is a graph showing the relationship between power generation time and current, for comparative examples, related to the embodiment of the invention.

On the other hand, as is clear from FIG. 5, in Comparative Example 1 in which the alcohol was supplied in the liquid state and in Comparative Example 2 in which the high-concentration aqueous solution of the alcohol was supplied, conspicuous crossover of fuel occurred, and power generation was substantially impossible.

In addition, the water generated at the air electrode 7 could be utilized for the reaction on the fuel electrode 5 side, without using an accessory disposed in the exterior of the fuel cell as usual in the related art. As a result, it was possible to reduce the size of the electrochemical energy generating apparatus based on the present invention, such as the fuel cell system 1.

Furthermore, in Example 1, the amount of methanol supplied to the filter paper (fuel evaporating section 11) was controlled by the fuel supply amount controlling section 12, i.e., the amount of the evaporated fuel necessary for the cell reaction was dividedly supplied to the fuel electrode 5 (FIG. 3). As a result of this, it was possible to minimize the crossover of fuel and to further enhance the characteristics of the fuel cell system, which is an electrochemical energy generating apparatus based on the present invention, as compared with the case of supplying the total amount of methanol to the fuel evaporating section 11 at a time as in Example 2.

Example 3

A fuel cell system 1 was fabricated in the same manner as in Example 1, except that the system was so configured that methanol (20 μl) was supplied in a gaseous state.

Comparative Example 3

A fuel cell system 1 was fabricated in the same manner as in Example 1, except that the system was so configured that a water-methanol mixture (465 μl of water plus 35 μl of methanol) was supplied in a liquid state.

Characteristics of the fuel cell systems fabricated in Example 3 and Comparative Example 3 as above were evaluated. Specifically, under such a control that the voltage of the fuel cell was kept at 0.3 V, the current was serially measured, and the energy density was calculated. The results are shown in FIG. 6 and Table 1 below.

TABLE 1

|  | Volume of fuel (cc) | Total power generation (mWh) | Energy density (mWh/cc) |
|---|---|---|---|
| Example 3 | 0.020 | 16.1 | 806 |
| Comp. Ex. 3 | 0.500 | 16.4 | 32.8 |

Figure 6:
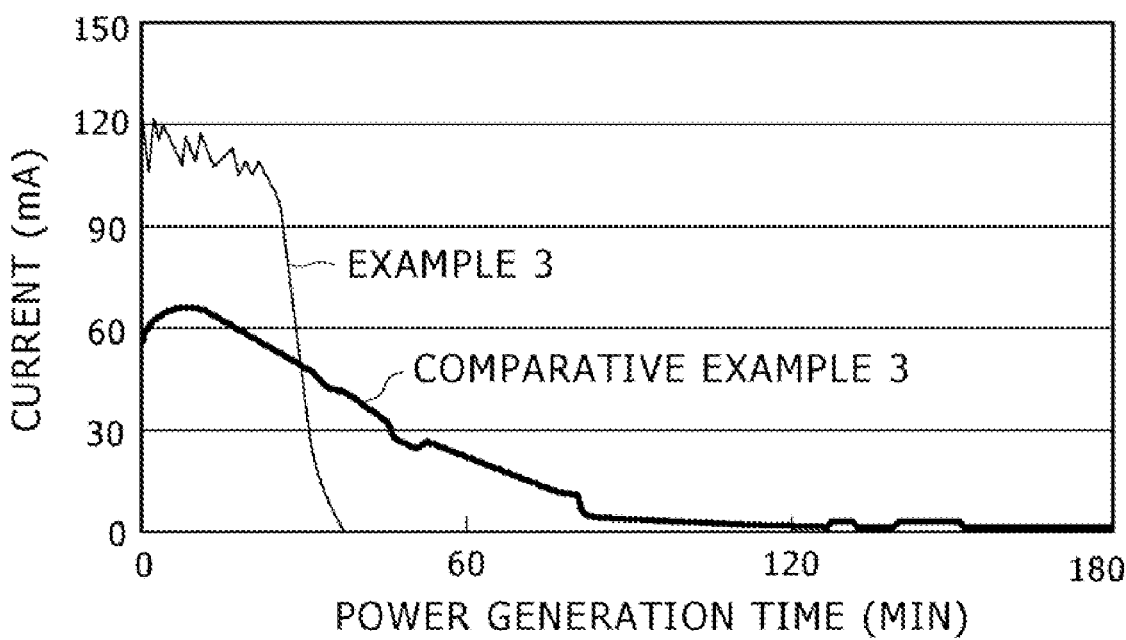
FIG. 6 is a graph comparatively showing the relationship between power generation time and current, for an example of the embodiment of the invention and a comparative example.

As is clear from FIG. 6 and Table 1 above, in Example 3, in which the fuel including an alcohol such as methanol and substantially not containing water was supplied in a gaseous state to the fuel electrode 5, it was possible to obtain a higher energy density and to enhance the characteristics of the electrochemical energy generating apparatus such as the fuel cell system 1, as compared with Comparative Example 3, in which the low-concentration aqueous solution of the alcohol was supplied in a liquid state.

While the present invention has been described referring to Examples (embodiments) thereof and Comparative Examples above, the above examples can be modified in a variety of manners based on the technical thought of the present invention.

For example, in the electrochemical energy generating apparatus based on the present invention, the shape of the electrochemical devices, the materials used therefor and the like can be selected appropriately. In addition, the positions where the fuel supplying unit (the fuel evaporating section and the fuel supply amount controlling section), the fuel cartridge, the electrochemical device and the like constituting the apparatus based on the present invention are laid out are not particularly limited.

Besides, while the cases of using methanol as the fuel have been described above, the present invention is not limited to the methanol fuel.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An electrochemical energy generating apparatus comprising: an electrochemical device which has an electrolyte membrane clamped between opposed electrodes and which generates electrochemical energy through a reaction of an alcohol with water at one of said electrodes; and a fuel supplying unit by which a fuel including said alcohol and substantially not containing water is supplied in a gaseous state to the side of said one of said electrodes of said electrochemical device, wherein said fuel supplying unit includes a filter paper as a fuel evaporating section, and a fuel supply amount controlling section including a syringe that controls the amount of the alcohol supplied to the filter paper.

2. The electrochemical energy generating apparatus as set forth in claim 1, wherein the amount of said gaseous fuel necessary for said reaction is dividedly supplied to said one of said electrodes by said fuel supply amount controlling section.

3. The electrochemical energy generating apparatus as set forth in claim 1, wherein said alcohol undergoes spontaneous volatilization before being supplied.

4. The electrochemical energy generating apparatus as set forth in claim 1, wherein said electrochemical device is configured as a fuel cell.

5. A method of driving an electrochemical energy generating apparatus comprising an electrochemical device which has an electrolyte membrane between opposed electrodes and which generates electrochemical energy by a reaction of an alcohol with water at one of said electrodes, and a fuel supplying unit by which a fuel including said alcohol and substantially not containing water is supplied to the side of said one of said electrodes, said method comprising supplying said fuel in a gaseous state to said one of said electrodes by said fuel supplying unit, wherein said fuel supplying unit includes a filter paper as a fuel evaporating section and a fuel supply amount controlling section including a syringe, said fuel is evaporated in said fuel evaporation section, and control of the amount of said fuel supplied to said fuel evaporation section or control of the amount of said evaporated fuel supplied to said electrochemical device is conducted by said syringe of the fuel supply amount controlling section.

6. The method of driving an electrochemical energy generating apparatus as set forth in claim 5, wherein the amount of said fuel necessary for said reaction is dividedly supplied to said one of said electrodes by said fuel supply amount controlling section.

7. The method of driving an electrochemical energy generating apparatus as set forth in claim 5, wherein said alcohol undergoes spontaneous volatilization before being supplied.

8. The method of driving an electrochemical energy generating apparatus as set forth in claim 5, wherein said electrochemical device is configured as a fuel cell.

* * * * *